US006804815B1

United States Patent
Kerr et al.

(10) Patent No.: US 6,804,815 B1
(45) Date of Patent: Oct. 12, 2004

(54) SEQUENCE CONTROL MECHANISM FOR ENABLING OUT OF ORDER CONTEXT PROCESSING

(75) Inventors: Darren Kerr, Palo Alto, CA (US); Jeffery B. Scott, Durham, NC (US); John William Marshall, Cary, NC (US); Kenneth H. Potter, Raleigh, NC (US); Scott Nellenbach, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 09/663,775

(22) Filed: Sep. 18, 2000

(51) Int. Cl.$^7$ .................................................. G06F 9/46
(52) U.S. Cl. ........................ 718/100; 718/107; 718/108; 712/218
(58) Field of Search .................................. 718/100, 102, 718/107, 108; 712/23, 218, 222, 228, 236; 711/149; 709/100, 102, 106, 108

(56) References Cited

U.S. PATENT DOCUMENTS

| | | | | |
|---|---|---|---|---|
| 3,866,175 A | * | 2/1975 | Seifert et al. | .......... 340/825.52 |
| 3,923,139 A | * | 12/1975 | Mesnil et al. | ................. 400/61 |
| 4,780,812 A | * | 10/1988 | Freestone et al. | ........... 711/149 |
| 5,488,713 A | * | 1/1996 | Norton et al. | ................. 703/22 |
| 5,721,855 A | * | 2/1998 | Hinton et al. | ................ 712/218 |
| 5,768,530 A | * | 6/1998 | Sandorfi | ..................... 709/233 |
| 5,867,683 A | * | 2/1999 | Witt et al. | ................... 712/218 |
| 5,884,062 A | * | 3/1999 | Wichman et al. | ........... 712/218 |
| 5,918,055 A | * | 6/1999 | Crawford et al. | ........... 710/240 |
| 5,956,340 A | * | 9/1999 | Afek et al. | .................. 370/412 |
| 6,061,785 A | * | 5/2000 | Chiarot et al. | .............. 712/236 |
| 6,101,599 A | | 8/2000 | Wright et al. | |
| 6,173,386 B1 | | 1/2001 | Ket et al. | |
| 6,195,739 B1 | | 2/2001 | Wright et al. | |
| 6,272,621 B1 | | 8/2001 | Ket et al. | |
| 6,377,984 B1 | * | 4/2002 | Najork et al. | ................ 709/217 |
| 6,513,108 B1 | | 1/2003 | Kerr et al. | |
| 6,581,111 B1 | * | 6/2003 | Lakhanpal et al. | ............ 710/5 |
| 6,581,155 B1 | * | 6/2003 | Lohman et al. | ............. 712/222 |
| 6,654,907 B2 | * | 11/2003 | Stanfill et al. | ................. 714/16 |
| 6,662,297 B1 | * | 12/2003 | Boom et al. | ................. 712/245 |
| 2002/0023202 A1 | * | 2/2002 | Mukherjee | .................... 712/225 |
| 2002/0053014 A1 | * | 5/2002 | Iadonato et al. | .............. 712/23 |
| 2003/0023837 A1 | * | 1/2003 | Johnson | ....................... 712/228 |
| 2003/0140189 A1 | * | 7/2003 | Bogin et al. | ................. 710/240 |
| 2003/0196075 A1 | * | 10/2003 | Akkary et al. | .............. 712/218 |
| 2003/0200397 A1 | * | 10/2003 | McAllister et al. | ......... 711/141 |

OTHER PUBLICATIONS

U.S. patent application Ser. No. 09/663,777, Kerr et al., filed Sep. 18, 2000.

* cited by examiner

Primary Examiner—Meng-Al T. An
Assistant Examiner—Lilian Vo
(74) Attorney, Agent, or Firm—Cesari and McKenna, LLP

(57) ABSTRACT

A sequence control mechanism enables out-of-order processing of contexts by processors of a symmetric multiprocessor system having a plurality of processors arrayed as a processing engine. The processors of the engine are preferably arrayed as a plurality of rows or clusters embedded between input and output buffers, wherein each cluster of processors is configured to process contexts in a first in, first out (FIFO) synchronization order. However, the sequence control mechanism allows out-of-order context processing among the clusters of processors, while selectively enforcing FIFO synchronization ordering among those clusters on an as needed basis, i.e., for certain contexts. As a result, the control mechanism reduces undesired processing delays among those processors.

32 Claims, 4 Drawing Sheets

SEQUENCE CONTROL MECHANISM FOR ENABLING OUT OF ORDER CONTEXT PROCESSING

CROSS-REFERENCE TO RELATED APPLICATIONS

This invention is related to the following copending U.S. Patent Applications:

U.S. patent application Ser. No. 09/663,777 titled, Packet Striping Across a Parallel Header Processor, filed on even date herewith and assigned to the assignee of the present invention; and U.S. patent application Ser. No. 09/106,246 titled, Synchronization and Control System for an Arrayed Processing Engine, filed on Jun. 29, 1998 and assigned to the assignee of the present invention.

FIELD OF THE INVENTION

The present invention generally relates to multiprocessor systems and, more specifically, to out-of-order data processing by processors of a

BACKGROUND OF THE INVENTION

A systolic array provides a common approach for increasing processing capacity of a computer system when a problem can be partitioned into discrete units of works. In the case of a one dimensional systolic array comprising a single "row" of processing elements or processors, each processor in the array is responsible for executing a distinct set of instructions on input data before passing it to a next element of the array. To maximize throughput, the problem is divided such that each processor requires approximately the same amount time to complete its portion of the work. In this way, new input data can be "pipelined" into the array at a rate equivalent to the processing time of each processor, with as many units of input data being processed in parallel as there are processors in the array. Performance can be improved by adding more elements to the array as long as the problem can continue to be divided into smaller units of work. Once this dividing limit has been reached, processing capacity may be further increased by configuring multiple rows in parallel, with new input data allocated to the first processor of a next row of the array in sequence.

A symmetric multiprocessor system configured as a systolic array typically guarantees first in, first out (FIFO) ordering of context data processing. As used herein, context data or "context" is defined as an entire packet or, preferably, a header of a packet. According to FIFO ordering, the contexts processed by the processors of the rows must complete in the order received by the processors before the rows of the array advance. Each processor is allocated a predetermined time interval or "phase" within which to complete its processing of a context; when each processor completes its context processing within the phase, this control mechanism is sufficient. However if a processor stalls or otherwise cannot complete its processing within the phase interval, all processors of the array stall in order to maintain FIFO ordering. Here, the FIFO ordering control mechanism penalizes both the processors of the row of the stalled processor and the processors of the remaining rows of the multiprocessor array. For most applications executed by the array, FIFO ordering is not necessary.

However, FIFO ordering may be needed to maintain an order of contexts having a dependency among one another; an example of a mechanism used to identify dependencies is a "flow". A flow is defined as a sequence of packets having the same layer 3 (e.g., Internet Protocol) source and destination addresses, and the same layer 4 (e.g., Transport Control Protocol) port numbers. In addition, the packets of a flow also typically have the same protocol value. The present invention is generally directed to a mechanism that enables selective FIFO ordering of contexts processed by a symmetic multiprocessor system.

SUMMARY OF THE INVENTION

The present invention comprises a sequence control mechanism that enables out-of-order processing of contexts by processors of a symmetric multiprocessor system having a plurality of processors arrayed as a processing engine. The processors of the engine are preferably arrayed as a plurality of rows or clusters embedded between input and output buffers, wherein each cluster of processors is configured to process contexts in a first in, first out (FIFO) synchronization order. According to the invention, however, the sequence control mechanism allows out-of-order context processing among the clusters of processors, while selectively enforcing FIFO synchronization ordering among those clusters on an as needed basis, i.e., for certain contexts.

In the illustrative embodiment, the control mechanism comprises an input sequence controller coupled to the input buffer and an output sequence controller coupled to the output buffer. Each context contains a queue identifier (ID) that uniquely identifies a flow of the context and a sequence number that denotes an order of the context within the flow. A minimum sequence number is used to enforce ordering within a flow having a common queue ID and, to that end, refects the lowest sequence number of a context for a flow that is active in the processing engine. Synchronization logic of the controllers maintains the minimum (lowest) sequence number for each active flow Broadly stated, out-of-order context processing among the clusters is allowed for contexts having different queue IDs, while FIFO synchronization is enforced among the clusters for contexts having the same queue ID. Ordering of contexts associated with a flow is enforced at the output buffer using the queue ID, sequence number and minimum sequence number information associated with each context. That is, the sequence controllers use the information to maintain FIFO synchronization throughout the processing engine, i.e, from the input buffer to the output buffer, for those contexts belonging to a flow and, thus, having the same queue ID.

Advantageously, the inventive sequence control mechanism reduces undesired processing delays among the processors of the arrayed processing engine. Use of the queue ID, sequence number and minimum sequence number information enables the input sequence controller to issue contexts of the same flow to any cluster, thereby exploiting the parallelism inherent in the arrayed processing engine. In addition, the information is used by the output sequence controller to ensure that transmission of a previous context from (off) the processing engine occurs prior to transmission of a subsequent context associated with that flow.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
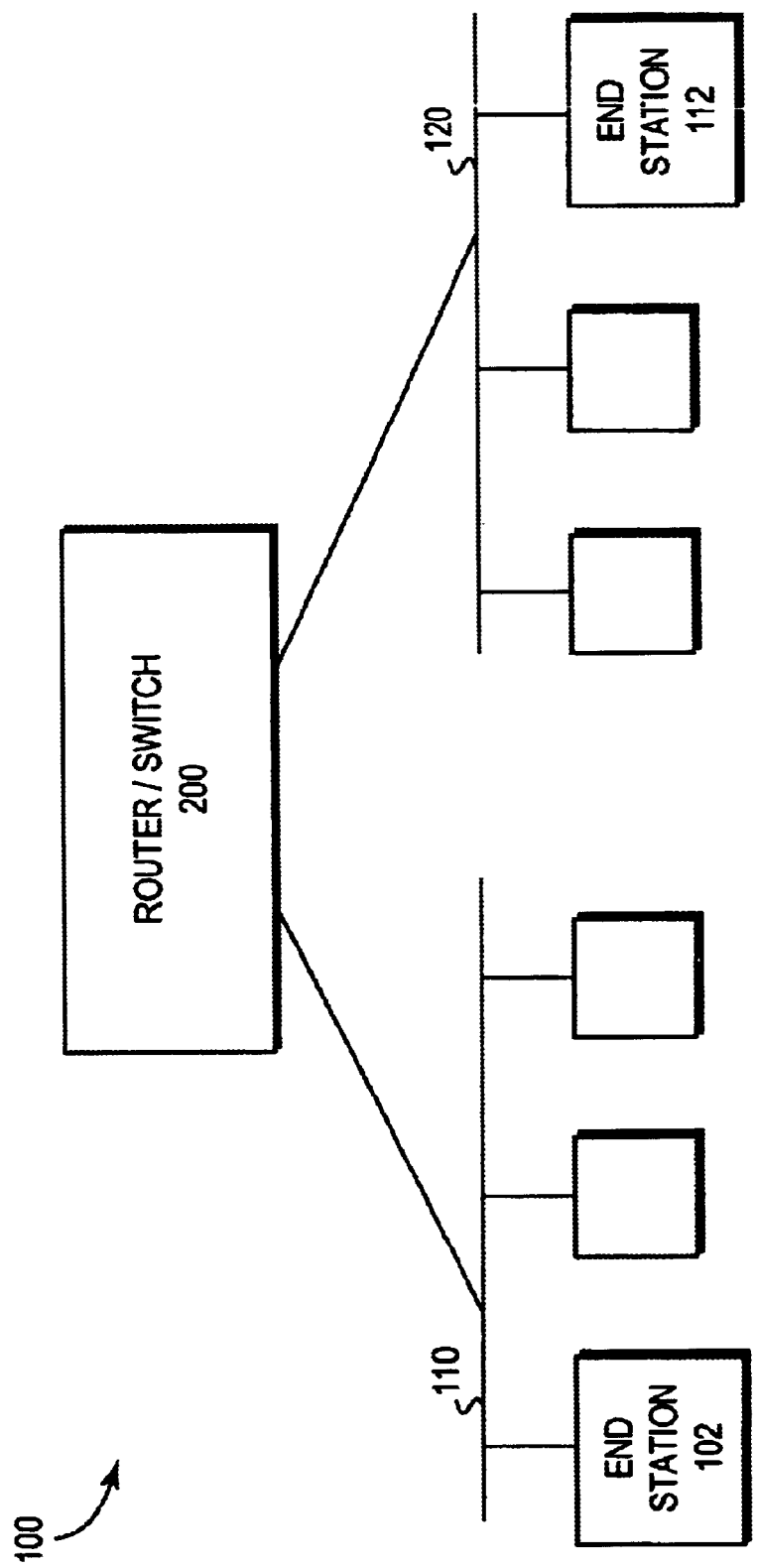
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising endstations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, Apple Talk or DECNet protocols.

Figure 2:
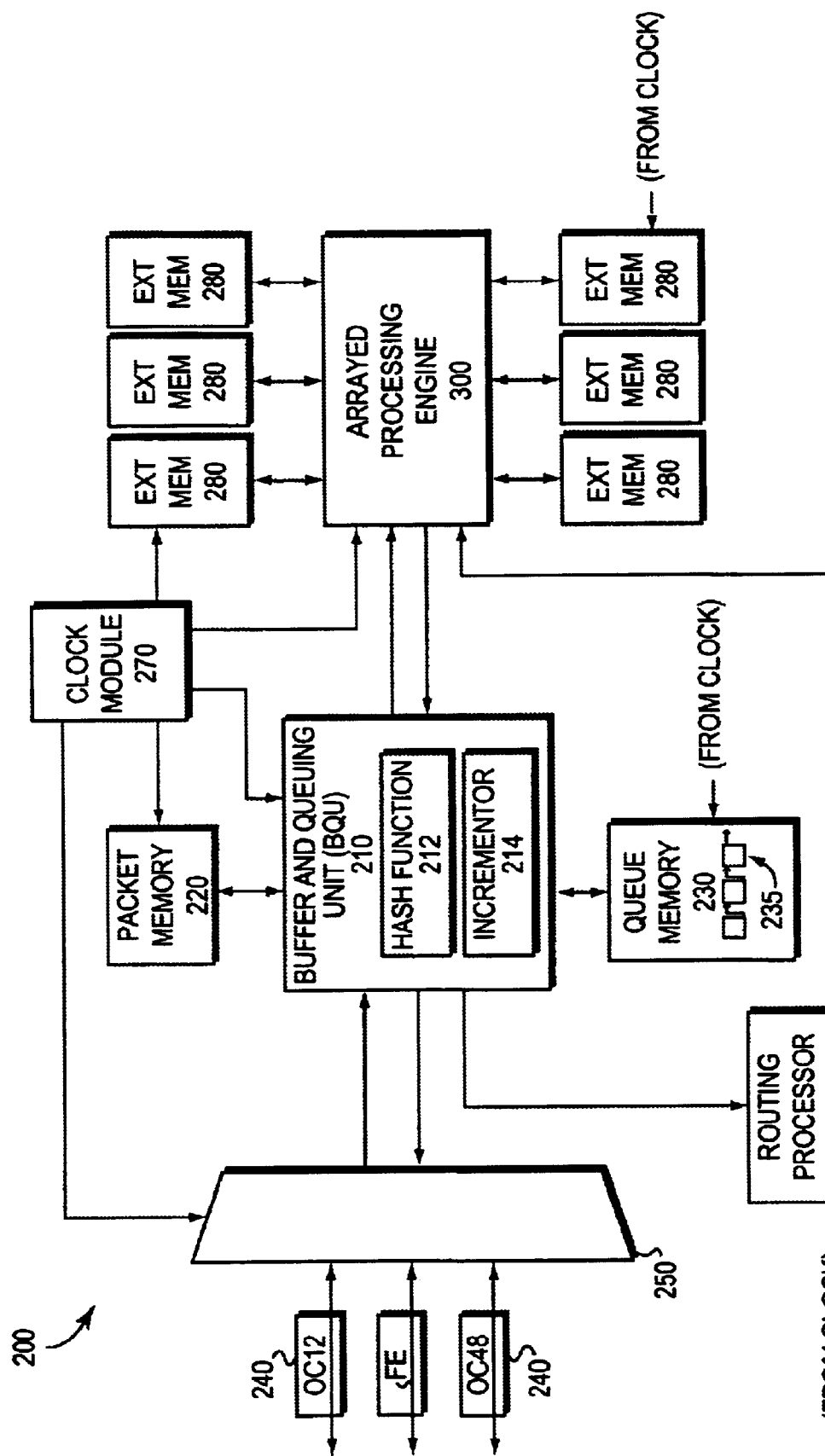
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. Operation of the switch will be described with respect to IP switching of packets, although the switch may be programmed for other applications, such as data encryption.

The switch 200 comprises a plurality of interconnected components including an arrayed processing engine 300, various memories, queuing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of, e.g., 200 megahertz (i.e., 5 nanosecond clock cycles) and globally distributed them via clock lines to the components of the switch.

The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 280. A feeder chip, hereinafter referred to as a buffer and queuing unit (BQU) 210, comprises data interface circuitry for interconnecting the processing engine with a plurality of interface cards 240 via a selector circuit 250. Incoming packets to the switch are received at the interface cards 240 and provided to the BQU 210 via the selector 250. The BQU parses a header from each packet and stores it on a data structure, such as linked list, organized as a queue 235 in a queue memory 230. The remaining packet "payload" is stored in a packet memory 220. For each received packet, the BQU builds a context for processing by the engine 300. In the illustrative embodiment, the context may comprise the header of each packet, although it may further comprise the entire packet. The BQU 210 provides each context to the processing engine which, after completing processing, returns the context to the BQU where the processed header is appended to the payload of the packet for delivery to the interface cards.

The interface cards 240 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 235 in the queue memory 230. The processing engine 300 generally functions as a switching processor that modifies packets and/or headers as the BQU 210 implements queuing operations.

A routing processor 260 executes conventional routing protocols for communication directly with the processing engine 300. The routing protocols generally comprise topological information exchanges between intermediate stations to determine preferred paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
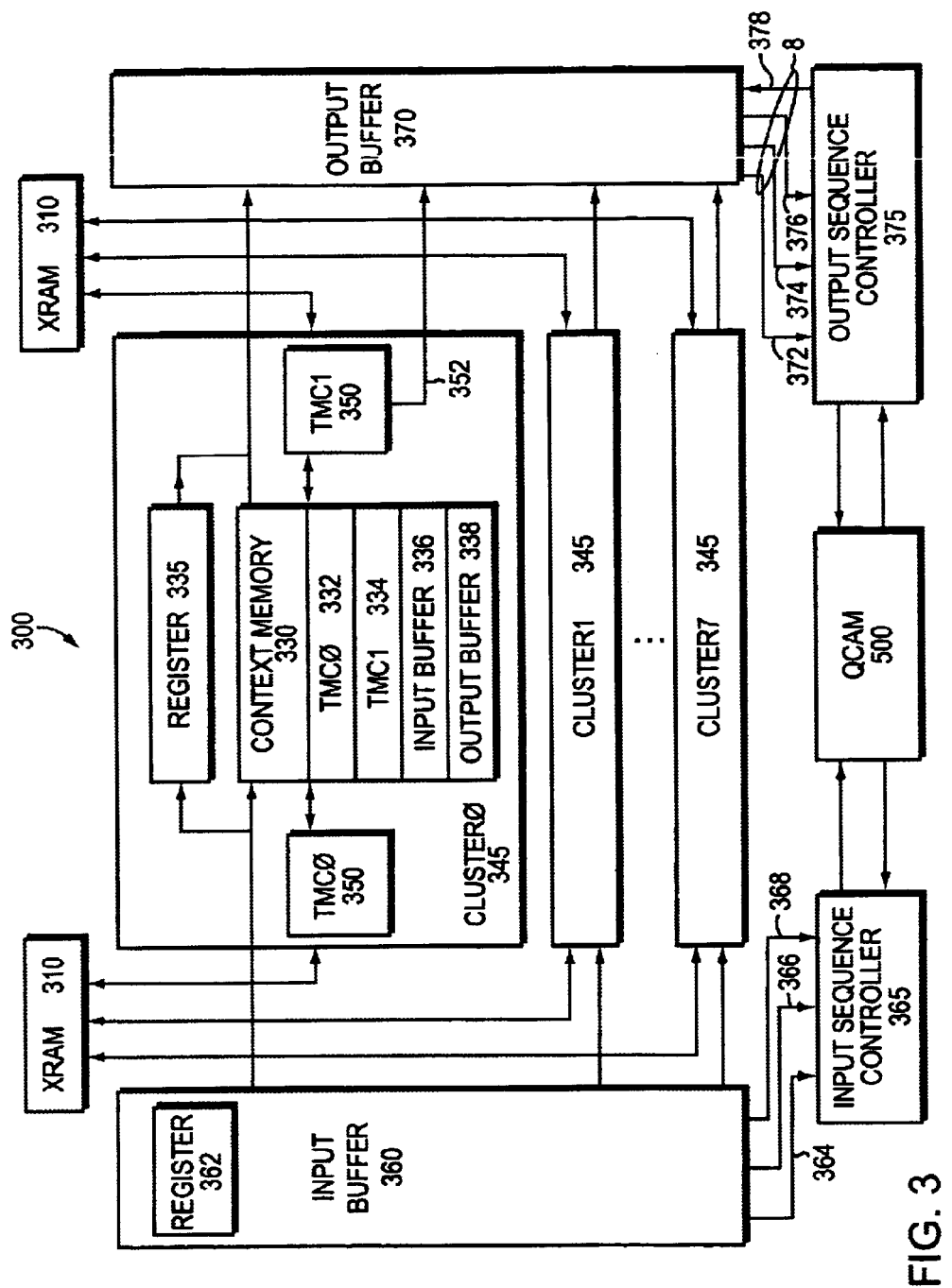
FIG. 3 is a schematic block diagram of a programmable arrayed processing engine having a plurality of processors configured as clusters.

FIG. 3 is a schematic block diagram of the programmable processing engine 300 which comprises an array of processors embedded between input and output buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. The transient data enters and exits the engine via 200 MHz 64-bit input and output data interfaces of the BQU 210. A remote processor interface (not shown) provides information, such as instructions and data, from a remote processor to the processors and buffers over a maintenance bus having multiplexed address/data lines.

The processing engine 300 comprises a plurality of processors 350 arrayed into multiple rows and columns that may be further configured as a systolic array. In the illustrative embodiment, the processors are arrayed as eight (8) rows and two (2) columns in an 8×2 arrayed configuration that is embedded between an input buffer 360 and an output buffer 370. However, it should be noted that other arrangements, such as 4×4 or 8×1 arrayed configurations, may be advantageously used with the present invention. The processors of each row are connected to a context memory 330; collectively, these elements of the row are organized as a cluster 345.

Each processor is a customized, single-threaded microcontroller (TMC) 350 having a dense structure that enables implementation of similar processors on an application specific integrated circuit. The present invention may apply to any number of processors within a column of the arrayed engine and, alternatively, to a single processor with multiple threads of execution. The TMC 350 is preferably a pipelined processor that includes, inter alia, a plurality of arithmetic logic units (ALUs) and a register file having a plurality of general purpose registers that store intermediate result information processed by the ALUs.

The processors (TMC 0,1) of each cluster 345 execute operations on "transient" data loaded into the context memory 330 by the input buffer 360, whereas the processors of each column operate in parallel to perform substantially the same operation on the transient data, but with a shifted phase. The context memory 330 stores transient "context" data (e.g., packet/frame data) flowing through the cluster that is unique to a specific process, along with pointers that reference data structures and tables stored in, e.g., Ext Mem 280 for use by the TMC 350.

Each Ext Mem 280 is coupled to an external memory (XRAM) controller 310 which, in the illustrative embodiment, is preferably embodied as a 200 MHz external memory interface coupled to a column of processors. The controller is configured to enable columned processor access to the non-transient data stored in the external column memory. The shared Ext Mem 280 accessed by the processors may further comprise entries of data structures, such as tables, that are constantly updated and accessed by the processors of each column. An example of such a table structure is the FIB table used by the processing engine to perform forwarding operations.

In the illustrative embodiment, the processors of a cluster inherently implement first in, first out (FIFO) ordering primarily because there is no mechanism for bypassing processors within the cluster. Each processor participates in a "software pipeline" phase and if processing by one processor of a cluster stalls (i.e., is delayed), all processors in that cluster are delayed. This arrangement can create undesired dependencies if all phases do not complete within a maximum interval and the contexts are unrelated. In this case, the depth of each cluster directly affects the magnitude of undesired dependencies.

However, each cluster of processors can execute independently with respect to other clusters. Thus, the number of clusters in the processing engine is significant since clusters (rows) of processors increase the concurrency of processing within the engine. Synchronization among the clusters is needed to maintain FIFO ordering. By modifying this synchronization method, undesired dependencies can be avoided by enforcing FIFO synchronization on an as needed basis. Thus, a solution to the problem of a processor requiring additional time to complete its context processing is to allow out-of-order processing among the clusters of processors. That is, if a processor of a cluster stalls and there is no dependency between the active contexts in the stalled cluster and in other clusters of the processing engine, then the contexts in the other clusters may be transmitted from the processing engine once their processing completes. Such concurrency facilitates the selective FIFO ordering technique described herein to thereby enable out-of-order context processing.

The present invention comprises a sequence control mechanism that enables out-of-order processing of contexts by processors of a symmetric multiprocessor system arrayed as a processing engine to thereby reduce undesired processing delays among those processors. As described herein, the sequence control mechanism (i.e., sequence controller) generally allows out-of-order context processing among the clusters/rows of processors, yet selectively enforces FIFO synchronization ordering among those clusters on an as needed basis, i.e., for certain contexts. To that end, the sequence controller utilizes a queue identifier (ID) and a sequence number assigned to each context to maintain FIFO synchronization throughout the processing engine, i.e, from input buffer 360 to output buffer 370, for those contexts belonging to a same flow. A flow is defined by parameters such as the IP source and destination address, the TCP port numbers and the protocol associated with a packet or group of packets.

In the illustrative embodiment, the BQU 210 assigns a queue ID and, if necessary, a sequence number to each context provided to the input buffer 360. The BQU 210 includes a first circuit 212 configured to execute a conventional hash function that generates a queue ID that uniquely identifies a flow of a context. That is, the flow parameters of a context are transformed by the hash function 212 to a 32-bit queue ID. It should be noted that the hash function 212 may utilize other information that enables identification of dependencies among various contexts in order to derive a queue ID.

For example, assume that a stream of data is received at the input buffer 360 from the BQU wherein the stream of data comprises a plurality of contexts, each having a different flow. The hashing function transforms the flow of each context to a queue (Q) ID such that the stream comprises Q1 and Q7 contexts. The input buffer 360 distributes these contexts among the clusters 345 of the processing engine 300 such that Q1 is provided to Cluster 0 and Q7 is provided to Cluster 1. According to conventional FIFO ordering, each context processed by a cluster must complete in the order of distribution by the input buffer to the clusters. That is, if one processor of a cluster stalls, then all processors of all clusters stall in order to maintain the FIFO ordering.

In accordance with an aspect of the present invention, however, assignment of queue IDs to contexts of different flows allows out-of-order processing by the clusters. That is, if the processors of Cluster 1 complete their processing of Q7 before the processors of Cluster 0 finish processing Q1, then Q7 may be forwarded to the output buffer 370 and out of (off) the processing engine before Q1. As a result, the order of processing by the engine and transmission off the engine may comprise Q7 and Q1.

The sequence controller further enables selective FIFO ordering particularly in the case when there are more than one contexts associated with a particular flow or queue ID.

For example assume that a second context having a flow that transforms to Q1 arrives at the input buffer 360 and is provided to a different cluster (e.g., Cluster 7) for processing. Thus, a first context of Q1 is assigned sequence number "1", e.g., Q (1,1) and is provided to Cluster 0, while a second context of Q1 is assigned sequence number "2", e.g., Q (1,2) and is provided to Cluster 7. Assume further that TMC 0 of Cluster 0 stalls during its processing of Q (1,1) or that processing of Q (1,1) consumes a time period that exceeds the duration of a phase. Meanwhile, TMCs 0,1 of Cluster 7 complete their processing of Q (1,2).

According to the selective FIFO ordering aspect of the present invention, context Q (1,2) cannot be transmitted to the output buffer 370 and off the processing engine 300 until processing of context Q (1,1) completes and that context has been transferred from the processing engine. That is, FIFO ordering is enforced for contexts associated with the same flow (or having the same queue ID). The novel control mechanism identifies dependencies among various contexts (i.e., those contexts associated with a particular flow) and imposes ordering among those contexts; however, the sequence control mechanism allows out-of-order processing and completion of those contexts having no dependencies.

In the illustrative embodiment, a second circuit of the BQU 210 functions as an incrementor 214 to generate the sequence number associated with a particular context of a flow by, e.g., incrementing a value. According to the invention, sequence numbers are employed to denote an order of contexts within a flow and the BQU assigns those sequence numbers to consecutive contexts in an increasing order. It should be noted, however, that if the input buffer 360 is not configured to interpret a sequence number and/or queue ID assigned by the BQU, it may assign its own sequence number and/or queue ID to contexts of a flow.

Figure 4:
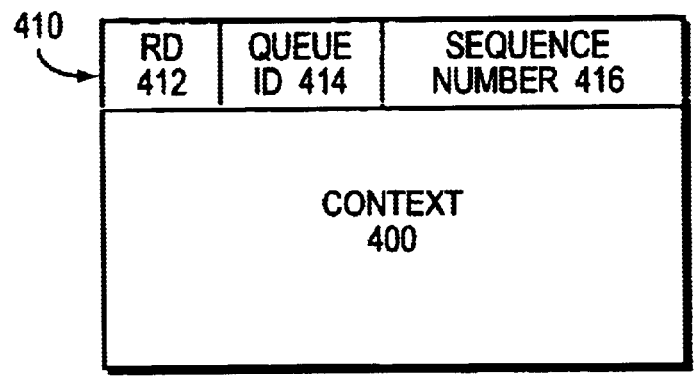
FIG. 4 is a schematic block diagram of a context adapted for processing by the programmable arrayed processing engine.

FIG. 4 is a schematic block diagram of a context 400 that is constructed by the BQU 210 and provided to the input buffer 360 of the processing engine 300. The context is defined by a predetermined number of bytes of data and includes an appended header 410 having a plurality of fields. Specifically, these fields include a row direction (RD) field 412, a queue ID field 414 and a sequence number field 416. The content of the RD field 412 instructs (i.e., forces) the input buffer 360 to transfer the context to a particular cluster 345 as opposed to the next available cluster of the processing engine. The queue ID field 414 contains a 32-bit queue ID assigned to the context 400 and, if necessary, the sequence number field 416 contains a 16-bit sequence number assigned to the context.

The context 400 is transferred by the BQU to the input buffer 360, which parses ("strips off") the queue ID and sequence number for storage in a register 362 of the input buffer. The remaining portion of the context (which typically comprises a packet header) is stored in an input buffer portion 336 of the context memory 330 contained within the cluster to which the context is transferred. The information stored in the register 362 is associated with the context 400 stored in the context memory 330; as a result, the register information "flows" with its context through the processing engine.

In the illustrative embodiment, there are preferably four (4) portions of the context memory contained in each cluster of the processing engine: portions 332, 334 for each TMC 0,1, the input buffer portion 336 and an output buffer portion 338. In addition, there is an out-of-band register 335 corresponding to the context memory 330 of each cluster 345 and configured to store the queue ID and the sequence number "control" contents passed from register 362. By separating the control information from the actual context "data" (e.g., packet header), software executing on the TMC processors can easily process the context data without parsing the control information associated with that context. The sequence number and queue ID control information flow with their context and are not actually used again until the output buffer 370 employs that information to determine when the particular context may be transmitted from the processing engine.

According to the invention, the processing engine 300 also includes an input sequence controller 365 coupled to the input buffer 360 and an output sequence controller 375 coupled to the output buffer 370. These controllers, which are preferably implemented as combinational logic circuits, enable out-of-order context processing among the clusters 345 of processing engine 300, while enforcing FIFO synchronization ordering among those clusters for contexts of a flow to thereby reduce undesired processing delays among those processors. The controllers are connected to a data structure 500 that is shared between the controllers. In the illustrative embodiment, this shared data structure is preferably a content addressable memory (CAM) that maintains a list of active flows or "queues" in the processing engine. By utilizing a queue (Q) CAM structure, the sequence controllers can search, in parallel, for all active queues in the processing engine.

Figure 5:
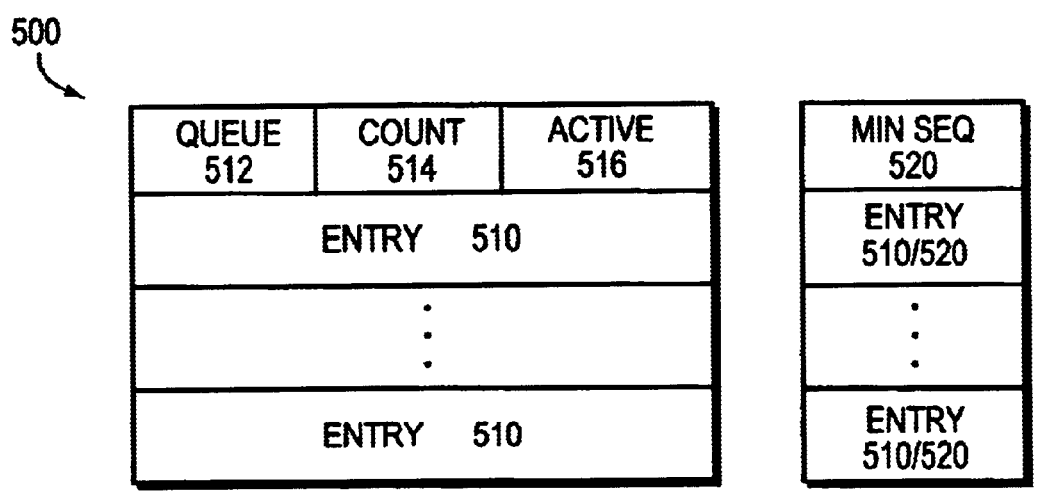
FIG. 5 is a schematic block diagram of a queue content addressable memory that may be advantageously used with the present invention.

FIG. 5 is a schematic block diagram of the QCAM 500 comprising a plurality of entries 510, each containing a 32-bit queue field 512, a 5-bit count field 514 and a 1-bit active field 516. In addition, a 16-bit minimum sequence field 520 may be included within each entry 510 of the QCAM 500 or may be implemented as an entry 520 of another data structure associated with the QCAM. The queue field 512 stores a queue ID of a context associated with a particular queue/flow, whereas the count field 514 stores information indicating the number (i.e., the count) of contexts associated with the flow (or queue ID) that is active in the processing engine and the active field 516 indicates whether the QCAM entry is valid (i.e., whether the queue is active in the processing engine). Notably, a context is "active" in the processing engine if it is stored in a context memory 330 of a cluster 345 between the input and output buffers. The minimum sequence field 520 is used to enforce ordering within a flow having a common queue ID and, to that end, stores the lowest sequence number of a context 400 for a flow/queue that is active in the processing engine. Notably, the value of the minimum sequence number is relative to the number of contexts associated with the flow that is active in the processing engine; this number is incremented by the output sequence controller 375 as contexts are transmitted from the output buffer off the processing engine 300.

In the illustrative embodiment, ordering of contexts associated with a particular flow is enforced at the egress point (e.g., output buffer 370) of the processing engine 300 instead of the ingress point. Enforcement of ordering at the ingress point (e.g., the input buffer 360) of the processing engine requires that the input buffer sequentially issue contexts of the same flow to the same cluster. By using sequence numbers and queue IDs as defined herein, the sequence controller mechanism can issue contexts of the same flow to any cluster, thereby exploiting the parallelism inherent in a systolic array, such as the arrayed processing engine 300. The sequence numbers and queue IDs ensure that transmission of a previous context from the processing engine occurs prior to transmission of a subsequent context associated with that flow.

For example, two contexts having the same queue ID but different sequence numbers, e.g., Q (1,1) and Q (1,2) arrive at the input buffer 360 and are issued to different clusters, e.g., Cluster 0 and 1, respectively, for immediate processing. As described herein, Cluster 1 is unable to transmit context Q (1,2) to the output buffer, even if it completes processing, until Cluster 0 has completed processing of context Q (1,1) and transmitted that context to the output buffer 370. That is, the output buffer ensures that Cluster 1 is not allowed to transmit its context until Cluster 0 has completed processing and transmission of its context to that buffer 370.

In accordance with the present invention, the input and output sequence controllers execute a novel algorithm that ensures that all contexts in the same queue are processed with the same number of phases. The algorithm is apportioned into an input function executable by the input sequence controller 365 and an output function executable by the output sequence controller 375. Illustrative program code segments representative of the novel input and output functions are as follows:

Input Function:
if (Q[inputContext.queueID].isActive) {
 Q[inputContext.queueID].count++;
} else {
 Q[inputContext.queueID].isActive=TRUE;
 Q[inputContext.queueID].count=1;
 Q[inputContext.queueID].minSeq=
  inputContext.sequence; //could be set to 1
}
Output Function:
if (Q[outputContext.queueID].minSeq=outputContext.sequence) {
 TransmitRequest for row N;
 {{// operation performed in 1 cycle
 Q[inputContext.queueID].minSeq++;
 Q[inputContext.queueID].count--;
 if (Q[inputContext.queueID].count=0)
  Q[inputContext.queueID].isActive=FALSE;
}}
} else {
 STALL
}

The notation Q[xContext.queueID] denotes a lookup operation into the QCAM on the basis of the queue ID. Referring to the input function code, if a lookup operation into the QCAM 500 by the input sequence controller 365 results in a "hit" on an entry 510 having the queue ID of a particular context, then the active and count fields of that entry are examined. Specifically, if a context 400 having a particular queue ID is active in the processing engine (i.e., the active bit is asserted) and a subsequent "input" context of the same queue ID arrives at the input buffer 360, then the input function specifies incrementing the count. In other words, the count information stored in the count field 514 of the QCAM is incremented for each successive context of the queue ID.

If, however, the lookup operation into the QCAM results in a "miss", a new entry 510 of the QCAM is allocated and the queue ID associated with the flow of the input context is inserted into the queue field 512 of that entry. Thereafter, the active field 516 of the allocated QCAM entry is activated (e.g., set to 1) and the count field 514 is incremented (e.g., set to 1) indicating that the input context is the first active context in the processing engine for the queue. In addition, the content of the minimum sequence number field 520 associated with the allocated queue entry 510 is set to the assigned sequence number of the first context of a flow. For example, a first context that arrives at the input buffer having a particular flow is assigned a queue ID for that flow and a sequence number equal to, e.g., "1". The minimum sequence number is thus set to "1", even though the next context arriving at the input buffer having the same queue ID is assigned a sequence number of "2".

When the BQU 210 transmits a context 400 to the input buffer, the input buffer 360 issues a "new context" control signal over line 364 to the input sequence controller 365 that triggers execution of the input function by that controller. Essentially, the new context signal informs the input sequence controller that a new input context is available within the processing engine and also instructs the controller 365 to update the QCAM 500 with appropriate information. The appropriate information preferably includes the sequence number and queue ID associated with that new context. The input buffer 360 transmits the sequence number and queue ID signals over lines 366, 368, respectively, to the input sequence controller.

It should be noted that the input sequence controller 365 executes the input function once for each input context 400 received at the input buffer 360. On the other hand, the output sequence controller 375 executes the output function for each row/cluster 345 that requests transmission of its processed "output" context to the output buffer 370. Thus, for the illustrative processing engine 300 having eight (8) clusters 345, the output sequence controller 375 executes the output function 8 times, one for each cluster.

Upon completing processing of a context, a processor, e.g., TMC 1, of a cluster 345 issues a pdone completion signal over line 352 to the output buffer 370. In response, the output buffer issues a context request signal over line 372 to the output sequence controller 375 informing the controller that this particular output context is a candidate for transmission off the processing engine. The output buffer also provides to the controller 375 a sequence number signal associated with the output context over line 374 and a queue ID signal associated with that output context over line 376. The output sequence controller grants the request for transmission off the engine by issuing an acknowledge (Ack) signal over line 378 for each context request issued by the output buffer. Each of the signals exchanged between the output buffer and the output sequence controller is replicated, e.g., 8 times, once for each cluster.

Before the output buffer may transmit the output context off the processing engine, the output sequence controller executes the output function to validate that the sequence of that context is correct. That is, the output function is executed by the output sequence controller 365 for each cluster to validate the orderly sequence of output contexts for a particular flow. At this time, the context 400 may be processed out-of-order depending upon its dependencies and associations with other contexts of the particular flow.

Refer now to the output function code. In response to the context request, the output sequence controller 375 scans the QCAM 500 for an entry 510 having the queue ID associated with that context request. When a matching entry is found, the output sequence controller 375 determines whether to grant the transmission request by comparing the sequence number associated with the output context with the minimum sequence number stored in the QCAM for the entry having a matching queue ID. If these sequence numbers are equal, the output context may be transmitted from the cluster (row N) to the output buffer. Upon rendering the decision to transmit the context from the processing engine, the sequence controller 374 performs the following update operations on the corresponding entry 510 of the QCAM 500. Specifically, the output sequence controller 375 (i) increments the minimum sequence number associated with the queue ID of the output context, (ii) decrements the count associated with that context, (iii) tests the count to be zero and, if the count equals zero, (iv) deasserts the active bit associated with the entry to denote that the queue is no longer active in the processing engine.

On the other hand, if the minimum sequence number does not equal the output context sequence number, then an output context that is out-of-order within a particular flow has completed processing and has requested transmission from the processing engine. In other words, the output context is "out-of-order" with respect to at least one other active context in the processing engine and, as a result, the transmission request is not granted for the output context. For example, assume there are two contexts having the same queue ID that are active within the processing engine. The first context issued from that queue takes a relatively long time to complete processing at, e.g., Cluster 0. Even though a second context from that queue (flow) is issued to another cluster, e.g., Cluster 7, at a later time, it completes processing sooner than the first context. According to the invention, the request for transmission of the second context from the processing engine is not granted until the first context associated with that flow is processed and transmitted off the engine.

Referring to the output function code segment, the example above manifests as a failed condition of whether the minimum sequence number equals the output context sequence number and, therefore, the output function transitions to a STALL state for that particular output context sequence number. For example, if the minimum sequence number is "1" and the output context sequence number of the second context is "2", the condition fails because "1" does not equal "2". Essentially, the output buffer 370 and output sequence controller 375 must wait for the first context to complete and, as a result, transmission of the second context off the processing engine is stalled.

In accordance with the present invention, execution of the output function ensures and enforces order at an output interface of the processing engine for those contexts associated with a particular flow. That is, the second context associated with the flow continues to stall until the first context associated with that flow completes processing. Once the first context completes processing, the output buffer requests transmission of that processed context from the processing engine and the output sequence controller executes the output function for the processed context. Execution of the output function indicates that the first context of the flow meets the condition for transmission and, thus, allows that context to be transmitted from the processing engine. Once the update operations of the output function are executed by the output sequence controller, the second context having the particular queue ID is allowed to transmit off the processing engine. This is an example of how order is maintained for contexts associated with a particular flow in accordance with the selective FIFO ordering technique of the present invention.

In the illustrative embodiment, the output buffer 360 continues to assert the context request 372 for transmission of a context until the request is acknowledged by the output sequence controller 375. That is, until an Ack signal 378 is provided to acknowledge the transmission request for a context having a particular sequence number and queue ID, that context remains in a stalled state of the output function. Every transmit request issued by the output buffer to the output sequence controller must be acknowledged prior to allowing the context to transmit off the processing engine.

Operation of the processing engine in accordance with the improved control mechanism will now be described with respect to FIGS. 1–5. When a context 400 is received at the input buffer, the buffer 360 parses the queue ID and sequence number, and loads that information into register 362. The input buffer provides the sequence number and queue ID to the input sequence controller 365 so that it can update an appropriate entry 510 of the QCAM 500. The input buffer 360 then loads the context 400 into the context memory 330 of a particular cluster 345 and the context proceeds to "ping-pong" through the portions of the memory 330 as it is processed by the processors 350. Meanwhile, the queue ID and sequence number are passed to register 335 associated with the context memory of the particular cluster.

The context 400 then propagates to the output buffer portion 338 of the context memory. The output buffer determines that it has an active context identified by the sequence number and queue ID information stored in register 335 that has completed processing and that requests transmission off the engine. Accordingly, the output buffer 370 transfers that information to the output sequence controller 375 in accordance with a context request for transmission of the output context from the processing engine. In response, the output sequence controller 375 executes the output function to determine whether that particular context may be transmitted off of the engine. Based upon the states of the other clusters, the controller 375 acknowledges the context request and sends that acknowledgement to the output buffer 370. Thus, the context is granted access to the output interface of the processing engine.

The contents of the register 335, along with context 400, are transmitted from the output buffer over the output interface from the processing engine 300 to the BQU 210. If the context is not allowed to transmit off the processing engine because it is out of sequence, transmission is stalled until the dependencies are resolved. Thus, the incoming order for a particular queue is maintained as the outgoing order for that particular queue in accordance with a "queue ordering" mode, as described herein. In an alternate embodiment, the BQU may maintain a sequential order of every context issued to the processing engine by assigning a fixed queue ID and incrementing the sequence number for each issued context.

While there has been shown and described an illustrative embodiment of a sequence controller configured to implement out-of-order processing of contexts by processors of an arrayed processing engine, it is to be understood that various other adaptations and modifications may be made within the spirit and scope of the invention. For example, the selective FIFO ordering technique may provide an advantage with even two clusters/rows of the processing engine. That it, assume that a context of a particular flow takes ten (10) times longer to process than other contexts of other flows. The context requiring substantially long processing is loaded into a first row of a processing engine having two rows of processors. Nine (9) other contexts of other flows may be processed by the second row of the processing engine during the time that the first context is processed by the first row. Thus, selective FIFO ordering facilitates out-of-order processing for an engine having a plurality of clusters/rows wherein there are no dependencies upon the contexts processed by the processors of those rows.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling out-of-order processing of contexts by processors of a multiprocessor system, the processors arrayed as a plurality of clusters embedded between input and output buffers, the method comprising the steps of:
   assigning each context a queue identifier (ID) and a sequence number, the queue ID uniquely identifying a flow of the context and the sequence number denoting an order of the context within the flow;
   distributing the contexts from the input buffer to the clusters;
   allowing out-of-order context processing among the clusters for contexts having different queue IDs; and
   enforcing first in, first out (FFO) synchronization context processing among the clusters or contexts having the same queue ID.

2. The method of claim 1 wherein the step of assigning comprises the step of deriving the queue ID using information that enables identification of dependencies among the contexts.

3. The method of claim 1, further comprising:
   transforming flow parameters of a context to the queue ID in accordance with a hash function.

4. The method of claim 1 wherein the step of assigning comprises the step of incrementing a predetermined value to generate the sequence number.

5. The method of claim 1 further comprising the step of coupling an input sequence controller to the input buffer and an output sequence controller to the output buffer.

6. The method of claim 5 further comprising interconnecting the input and output sequence controllers with a data structure that maintains a list of active flows in the system.

7. The method of claim 6 wherein the data structure is a content addressable, memory (CAM) having a plurality of entries.

8. The method of claim 6 further comprising the step of providing a queue field and a minimum sequence field within each entry of the data structure.

9. The method of claim 8 further comprising the step of executing an input function at the input sequence controller to update the data structure with the sequence number and queue ID associated with a new context.

10. The method of claim 9 wherein the step of updating comprises the steps of:
    storing the queue ID in the queue ID field of an appropriate entry; and
    storing a lowest sequence number of a context for a flow that is active in the system in the minimum sequence field of the entry.

11. The method of claim 10 wherein the step of storing a lowest sequence number comprises the step of setting the content of the minimum sequence field to the assigned sequence number of the first context of a flow.

12. The method of claim 8 further comprising the step of executing an output function at the output sequence controller to validate one of the out-of-order processing and FIFO synchronization processing of the contexts.

13. Apparatus for enabling out-of-order processing of contexts by processors of a processing engine, the processor arrayed as a plurality of cluster, the apparatus comprising:
    a hash function adapted to transform flow parameters of a context to a queue identifier (ID) that uniquely identifies a flow of the context;
    an incrementor coupled to the hash function and configured to increment a predetermined value to generate a sequence number denoting an order of the context within the flow;
    an input buffer of the processing engine coupled to the hash function and incrementor, the input buffer distributing the contexts to the clusters; and
    a sequence control mechanism that allows out-of-order context processing among the clusters for contexts having different queue Ids and enforces first in, first out (FIFO) synchronization contact processing among the clusters for contexts having the same queue ID.

14. The apparatus of claim 13 wherein the sequence control mechanism comprises an input sequence controller coupled to the input buffer and an output sequence controller coupled to an output buffer of processing engine.

15. The apparatus of claim 14 wherein the sequence control mechanism further comprises a data structure coupled between the input and output sequence controllers, the data structure maintaining a list of active flows in the system.

16. The apparatus of claim 15 wherein the data structure is a content addressable memory (CAM) having a plurality of entries, each entry including a queue field that stores the queue ID of a context and a minimum sequence field that stores a lowest sequence number of a context for a flow that is active in the engine.

17. A computer readable medium containing executable program instructions for enabling out-of-order processing of contexts by processors of a processing engine, the processors arrayed as a plurality of clusters embedded between input and output buffers, the executable program instructions comprising program instructions for:
    assigning each context a queue identifier (ID) and a sequence number, the queue ID uniquely identifying a flow of the context and the sequence number denoting an order of the context within the flow;
    distributing the contexts from the input buffer to the clusters;
    allowing out-of-order context processing among the clusters for contexts having different queue IDs; and
    enforcing first in, first out (FIFO) synchronization context processing among the clusters for contexts having the same queue ID.

18. The computer readable medium of claim 17 further comprising program instructions for executing an input function at an input sequence controller coupled to the input buffer, the input function updating a data structure with the sequence number and queue ID associated with a new context, the data structure maintaining a list of active flows in the processing engine.

19. The computer readable medium of claim 18 further comprising program instructions for executing an output function at an output sequence controller coupled to the output buffer, the output function validating one of the out-of-order processing and FIFO synchronization processing of the contexts.

20. Apparatus to enable out-of-order processing of contexts by processors of a multiprocessor system, comprising:
    input and output buffers, the processors arrayed as a plurality of clusters embedded between the input and output buffers;
    means for assigning each context a queue identifier (ID) and a sequence number, the queue ID uniquely identifying a flow of the context and the sequence number denoting an order of the context within the flow;

means for distributing the context from the input buffer to the clusters;

means for allowing out-of-order context processing among the clusters for contexts having different queue IDs; and means for enforcing first in, first out (FIFO) synchronization context processing among the clusters for contexts having the same queue ID.

21. The apparatus of claim 20, further comprising:

means for deriving the queue ID using information that enables identification of dependencies among the contexts.

22. The apparatus of claim 20, further comprising:

means for transforming flow parameters of a context to the queue ID in accordance with a hash function.

23. The apparatus of claim 20, further comprising:

means for incrementing a predetermined value to generate the sequence number.

24. The apparatus of claim 20, further comprising:

means for coupling an input sequence controller to the input buffer and an output sequence controller to the output buffer.

25. The apparatus of claim 20, further comprising:

means for interconnecting the input and output sequence controllers with a data structure that maintains a list of active flows in the system.

26. The apparatus of claim 25, further comprising:

the data structure is a content addressable memory (CAM) having a plurality of entries.

27. The apparatus of claim 25, further comprising:

means for providing a queue field and a minimum sequence field within each entry of the data structure.

28. The apparatus of claim 27, further comprising:

means for executing an input function at the input sequence controller to update the data structure with the sequence number and queue ID associated with a new context.

29. The apparatus of claim 28, further comprising:

means for storing the queue ID in the queue ID field of an appropriate entry; and means for storing a lowest sequence number of a context for a flow that is active in the system in the minimum sequence field of the entry.

30. The apparatus of claim 29, further comprising:

means for setting the content of the minimum sequence field to the assigned sequence number of the fist context of a flow.

31. The apparatus of claim 27, further comprising:

means for executing an output function at the output sequence controller to validate one of the out-of-order processing and FIFO synchronization processing of the contexts.

32. Electromagnetic signals propagating on a computer network, comprising:

said electromagnetic signals carrying instructions for execution on a processor for practicing a method of enabling out-of-order processing of contexts by processors of a multiprocessor system, the processors arrayed as a plurality of clusters embedded between input and output buffers, the method having the steps of:

assigning each context a queue identifier (ID) and a sequence number, the queue ID uniquely identifying a flow of the context and the sequence number denoting an order of thie context within the flow;

distributing the contexts from the input buffer to the clusters;

allowing out-of-order context processing among the clusters for contexts having different queue IDs; and enforcing first in, first out (FIFO) synchronization context processing among the clusters for contexts having the same queue ID.

* * * * *